Aug. 12, 1958 P. WENINGER 2,847,018
VEHICLES WITH ATTACHED STOWABLE TENT-LIKE STRUCTURES
Filed March 6, 1956 3 Sheets-Sheet 1
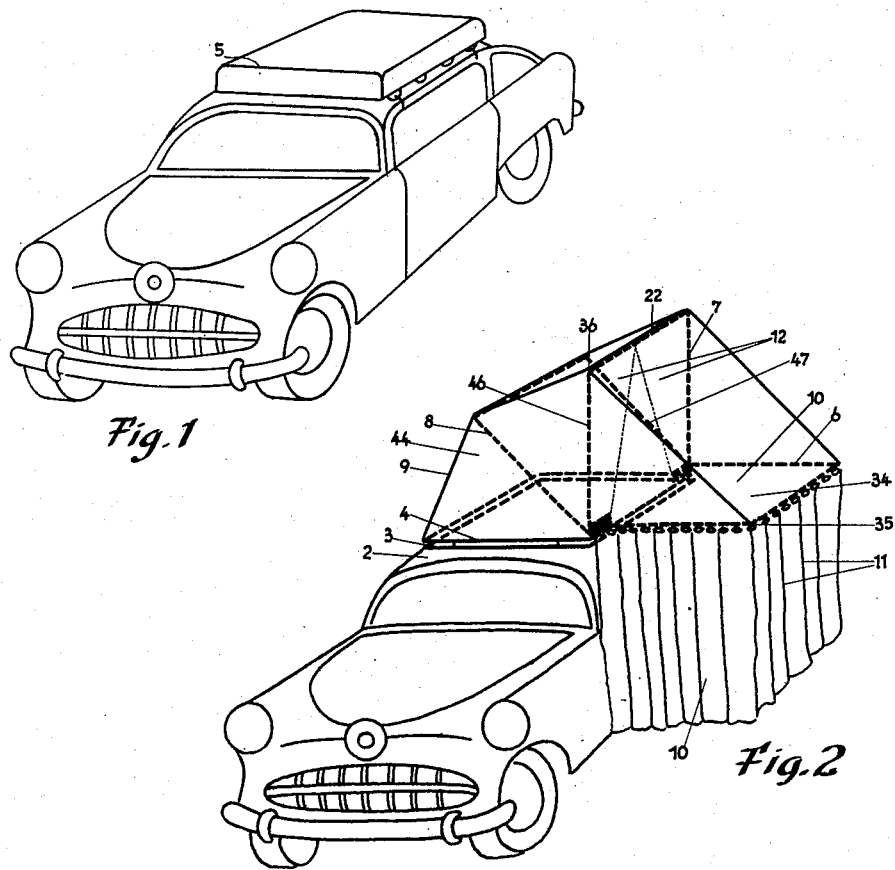
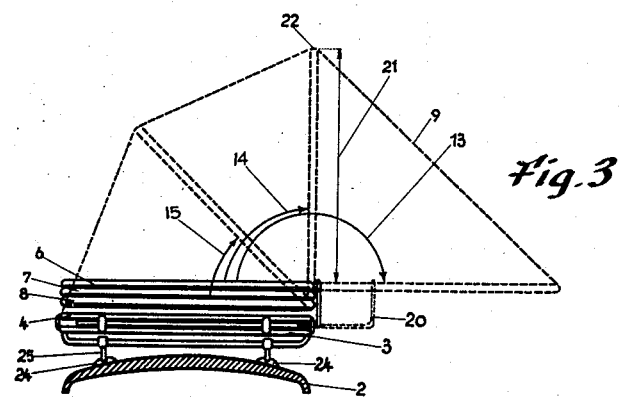

Aug. 12, 1958   P. WENINGER   2,847,018
VEHICLES WITH ATTACHED STOWABLE TENT-LIKE STRUCTURES
Filed March 6, 1956   3 Sheets-Sheet 2
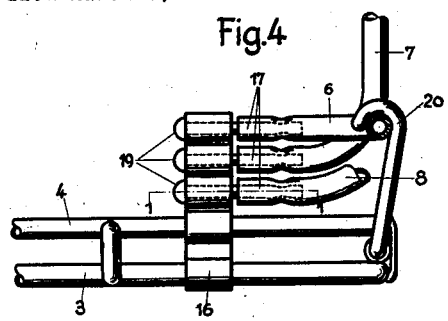
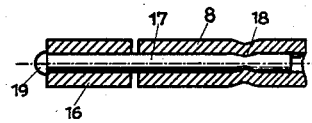
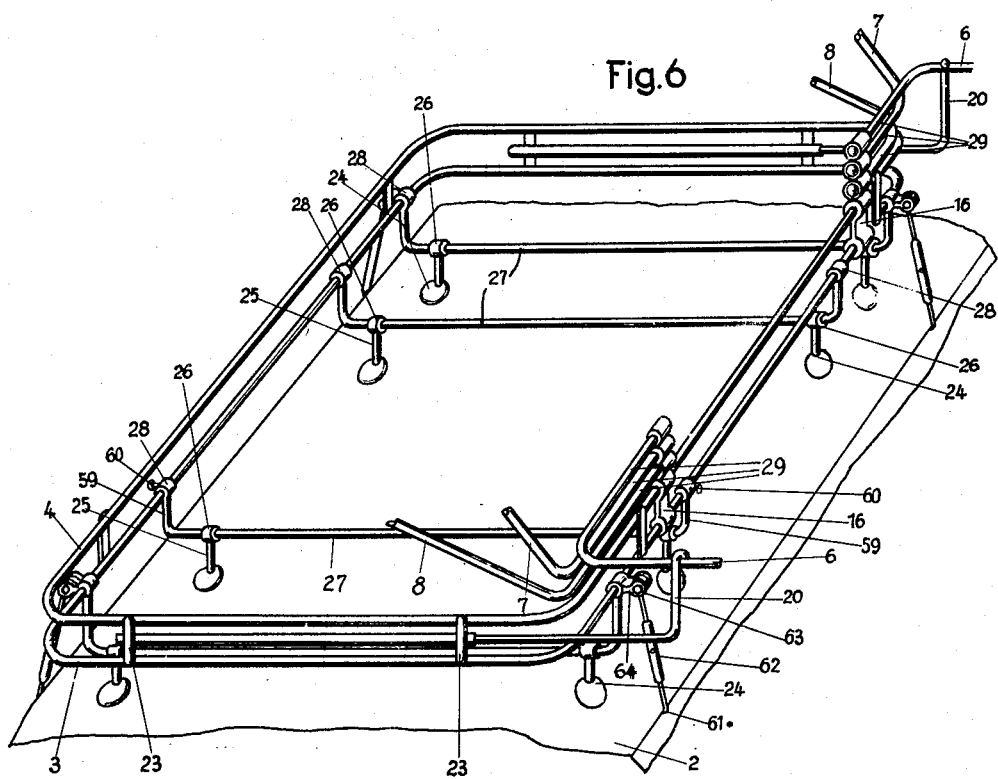

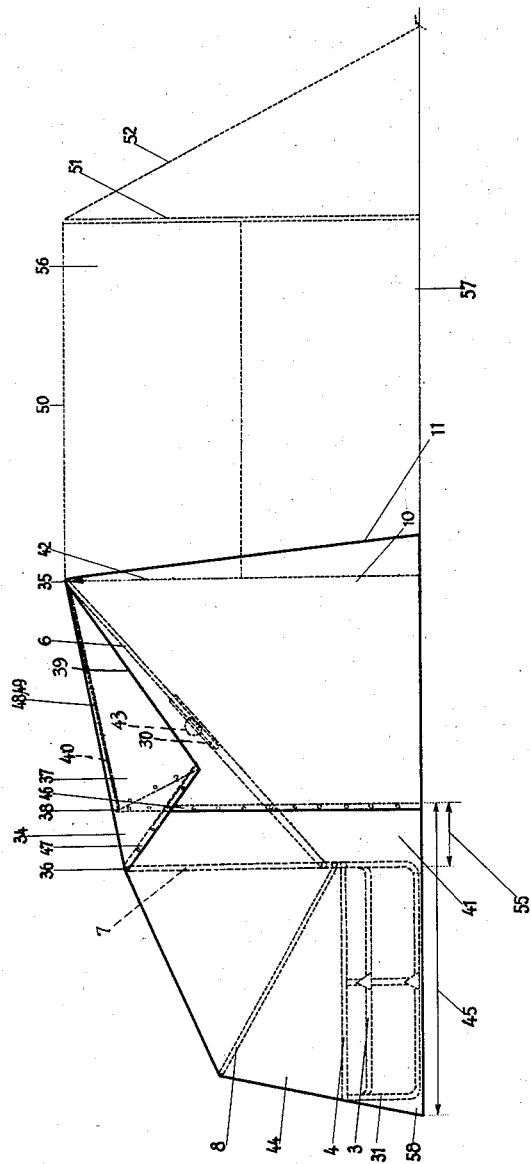

United States Patent Office 2,847,018
Patented Aug. 12, 1958

2,847,018

VEHICLES WITH ATTACHED STOWABLE TENT-LIKE STRUCTURES

Peter Weninger, Innsbruck, Austria

Application March 6, 1956, Serial No. 569,894

Claims priority, application Switzerland March 11, 1955

6 Claims. (Cl. 135—5)

This invention relates to improvements in devices for vehicle roofs, and more particularly to devices providing a tent-like shelter.

Various clamping devices are known wherein a tent structure is provided directly on the roof of a vehicle. In this case, an extremely narrow useable space is obtained on the roof and this sleeping space is entirely separate from the inside of the vehicle. The space provided on the roof can only be entered with exposure to the elements and by means of a ladder attached to the rear of the vehicle.

Tent shelters can also be erected on the ground near a vehicle but these have no connection to the roof and thus can only be entered from the vehicle by unsheltered passage. Moreover, such devices comprise in addition to the tent wall a very extensive and complicated framework which requires a considerable expenditure of time for assembly even when frames are used. A further disadvantage of such tents is that they must be anchored to the ground. Moreover, the weight of such tents are considerable and high costs result due the large amount of material required.

Another well known device consists of a bed fitted to the roof of a vehicle. Such a bed, when placed into condition for transport, can be shut by a lid which can be lifted when the device is used for camping, forming in raised position a roof upon the bed so as to provide a very narrow space by means of curtains hanging from the lateral edges of the roof. The stretching of tent covers from the lid in a direction oblique to the ground is insufficient and troublesome, and even if supplementary covers are hung over the open edges, protection from inclement weather is not possible especially from strong winds.

Another known device is constructed so as to form a lean-to roof structure on the front half of a vehicle roof in order to extend the roof structure forwardly by means of frames. The folding axis crosses the longitudinal axis of the vehicle so that the resultant space under the tent is very narrow and this space only affords a sufficient height at one part of its cross-section and, from this part, becomes lower in either or both lateral direction.

In many similar devices with tent awnings fitted to the roof of a vehicle, the fixing means are merely conventional slings and are not mechanically operating links; such fixing means as slings are incapable of securing a stable construction to resist storms.

This invention overcomes these drawbacks in that frames are mounted in swingable hoops on a base member which is secured to the roof of the vehicle on one side thereof, whereby one of the frames extends sidewards in its opened position above the surface of the roof. This side frame also covers a space of substantial magnitude at one side of the vehicle and forms with another, which projects upwardly from the vehicle roof, a framework for an awning. This awning covers a space which extends the inside space of the vehicle and extends above the roof as well as above one side of the vehicle, the upwardly projecting frame forming the awning in the opened condition so as to assume a saddle-roof-like structure which is common to the space on the roof and to the laterally joining space on the ground, so as to permit the inside of the vehicle and the space on the roof to provide a sheltered entry passage.

One advantage of this invention is in the provision of a framework which comprises three similarly shaped superimposed foldable hoops and a conventional member base secured to the vehicle roof. The base member is constructed in such a way that it can be used alone as a luggage carrier.

In accordance with this invention there is provided a covered space above the surface of the vehicle and a covered space of about equal magnitude on one side of the vehicle which can be converted in a few seconds from its idle or carried condition to its completely operative condition. It is thus possible to move about within the awning from the inside of the vehicle to the sleeping space on the roof and yet be entirely protected from the inclement weather whereby the space provided laterally from the vehicle is connected directly with the space on the roof and can be used as a living room.

A further advantage of the invention is that the device is self-bracing; the bracing for holding or stabilizing of the construction is produced without any anchoring to the ground, whereby the entire structure is completely independent of the ground. This is attained within the scope of this invention, by means of movable brackets which are provided as bracing devices on the base member. It is also possible in place of these movable brackets, on which only the horizontal hoops hang, to use a conventional scissor-link mechanism, the arms of which, for example, can be fastened to the horizontal hoop and to the base member.

In order that the invention may be more clearly understood and readily carried into effect, an embodiment thereof will now be described more fully with reference to the accompanying drawings in which:

Figure 1 shows a perspective view of a vehicle with the device of the invention in its transportable condition;

Figure 2 is a perspective view showing the vehicle with the device of the invention in its opened condition ready for use;

Figure 3 is a front view of the device with the vehicle roof being shown in section;

Figure 4 shows a view of certain details;

Figure 5 is a sectional view taken along line 1—1 of Figure 4;

Figure 6 is a perspective view of the framework; and

Figure 7 is a front view of the device when the base member has been removed from the vehicle.

On the roof 2 of the vehicle, there is suitably secured a base member constructed of tubes 3 and 4. This base member is constructed as a luggage carrier and carries, as shown in Figure 1, the device of the invention in its transportable condition. A protective cover 5 of waterproof material is placed over the whole device. It will be seen from Figure 1 that the device in the transportable condition is a completely flat structure. In Figure 2, the device is shown in its opened condition. Three hoops 6, 7 and 8 provided with an awning 9 are anchored by suitable bearing elements to the base member. The awning 9 is also connected on its two short sides and one of its long sides with the tube 4 of the base member so that when the hoops are unfolded three unequal sectors are produced. The first sector is defined by the horizontally lying hoop 6 and the vertically standing hoop 7, the second sector is defined by the hoop 7 and the hoop 8 which is inclined at an angle of substantially 45° and the last sector are defined by the hoop 8 and the tube 4 of the base member. The covering laterally of the vehicle zone corresponds to a saddle-roof and that formed by the two sectors which cover the roof of the vehicle assumes a mansard-like (a roof with two slopes on one side) construction. The horizontally lying hoop 6 carries a hanging curtain which is slidable on hoop 6 and which consists, for example, of two side and two entry portions 10 and 11. The space formed by the two sectors above the vehicle roof can be used as a sleeping space and can be covered without trouble with mattresses which can be carried if necessary within the base member in the transportable position. Between the sectors and the space described as the sleeping space or room a curtain 12 can be used as a separating wall. Since the space laterally of the vehicle is without a floor, it can be used as a storage place for various equipment, such as clothes and the like, and it is also possible for example to provide further sleeping positions by means of hammocks which can be secured for example to the two shorter sides of the horizontally lying hoop 6. The occupants can readily change behind the curtains 10, 11 without difficulty.

Figure 3 shows the device in front view disposed on a partially illustrated vehicle roof 2. The three hoops 6, 7 and 8 are shown in the transportable condition and the arrows 13, 14 and 15 show the different paths which the hoops follow so as to occupy the operative positions illustrated by the dotted lines.

In Figure 4 the special construction of the bearings for the hoops is illustrated. There is a view taken along one side of the vehicle and it is clear that the three hoops 6, 7 and 8 are disposed one above the other and secured to the base member by means of a clip or bracket 16. A portion of the hoops 6, 7 and 8 are here shown broken off and shown opened to operative position, the ends of the same being rounded off and bent so as to point towards one another. The end pieces of the hoops are provided with bearing pins 17 which are mounted in a bore provided in the hoops. These bearing pins are for their part supported in the clip or bracket 16 and can rotate therein. Due to the rounded off construction of the ends of the hoops, the middle hoop 7, in spite of its being mounted below hoop 6 which occupies a horizontal position, can open unrestrictedly into the vertical position. The means for retaining the pins 17 in the end pieces of the hoops 6, 7 and 8 is clearly shown in Figure 5 which is taken on the line 1—1 of Figure 4. The pins 17 have a restricted or narrower portion 18 and the material of the hoop is pressed into this restriction at this position so that the bearing pin 17 is immovably secured axially in the hoop. At the rearmost end of the bearing pins 17 are mounted in the bracket 16 and can rotate freely therein. According to this embodiment the pins 17 have heads 19 so as to prevent the hoop and the bearing pins from being displaced from the bracket 16. Since the hoops are mounted in relation to one long side and the two smaller sides of the vehicle in the manner of a mirror image it would be theoretically possible to have no displacement in the two brackets, but practically there may be a temporary lengthwise bending of the hoops as a result of various influences, whereby an axial displacement in the hoops can arise.

In Figures 3 and 6 there is illustrated the manner in which a bracket 20, which is displaceably mounted in the base member, can be applied to the hoop 6 disposed horizontally in the operative position so that the entire device, that is, the hoops together with the awning are held in the opened condition. Naturally such brackets are placed on both sides of the longitudinal edge of the vehicle whereby the device is self-bracing in spite of the space which is extended over free ground, no ground anchorage is necessary.

As a result of the particular form of the space illustrated in dotted lines in Figure 3, which is obtained by means of the hoops and awning 9 as well as the supporting of the hoop on a longitudinal side of the vehicle, a tent type structure is produced. The greatest height 21, which is in the form of a ridge line 22, is disposed over the longitudinal edge of the vehicle on which the hoops are mounted. In this way, a particularly convenient increase in height in the covered space for sleeping purposes is provided in addition to a corresponding increase in the freedom of movement at the edge of the space in question. In a particularly advantageous manner the hoop 6 which lies horizontally in the operative position is mounted uppermost on the base member whereby the projecting hoop 6 shows a sufficient height from the ground in order to enable a person to pass and walk in an upright position.

Naturally this hoop can also by means of a suitable construction of the awning 9 also be anchored with an upward slope, but in this case the part 10 in order that it may fall vertically must be cut at an angle on its upper edge, which however would cause difficulties in the folding up or closing of the device; the side parts must in this case be folded whereas in contrast they can, according to the illustrated embodiment, be laid flat without folds in the transportable position. The side parts are, according to this invention, packed in the transportable position over equipment such as mattresses, blankets and the like and thus form an additional covering for valuable goods.

The framework of the device is diagrammatically illustrated in Figure 6. The hoops 6, 7 and 8 are broken off in this figure and shown opened in the operative position. From this figure it is clearly seen that the base member consists of two peripheral tubes 3 and 4 which are joined to one another by clips 23. Since vehicles and their roofs are made in considerably differing sizes the peripheral tubes 3 and 4 of the base member may be made same size for all types of vehicles but there must be between the individual base member and the vehicle roof a spacing member with which the device can be secured. As securing means there can be used, for example, suction pads 24 as generally used for luggage carriers, with ball joints, the brackets 25 of these suction pads having sockets 26 whereby the pads are displaceably fastened on rails 27. These tube shaped rails 27 shown in the embodiment extend horizontally transverse to the vehicle roof 2 and are advantageously provided with short end pieces 59 bent upwards. To these end pieces 59 of each rail 27 there are provided sockets 28 displaceably mounted along both longitudinal parts of the lower tube 3 of the base member.

Although experience has shown that a satisfactory fastening can be obtained with two rails 27, the embodiment illustrates four rails 27 provided with sockets 26 in order to obtain a better fastening of the rails 27 each of which is fitted with two suction pads 24 and each coupled to an associated bracket 25. The length of the rails 27 is made equal to the breadth of the base member; the rails 27 can now be spaced more or less from one another in the longitudinal direction of the vehicle on the base member according to the length of a vehicle and then secured. Clamping screws 60 can be used as fastening means for securing the sockets 26 to the rails 27 and for securing the sockets 28 to the tube 3. The drawing shows only two of these clamping screws for purposes of clarity. Naturally, where there is increased rubbing it is possible to use self-clamping devices on the tube 3 or on the rails 27 or a device which rests in small grooves on the tube 3 of the base member.

If it is desired to facilitate the removal of the base member 3, 4 from the roof 2 it is possible to construct the sockets 26 or 28 so that they can be easily loosened, for example, by the provision of two articulated tongs which are adapted to part when removing the base member 3, 4 from the roof 2 and to move downwardly when fixing the base member to the roof whereby they can be pressed to the tube in question by suitable means. Through transverse displacement of the suction pads 24 on the rails 27 the device can be accommodated to any particular width. In this way the standard embodiment of the device according to the invention can be secured to any size of vehicle. In order to again place the base member 3, 4 on the vehicle roof 2, claws 61 may be used and are fixed by means of tension locks 62 to rigid lugs 64 provided on the base member 3, 4, the tension locks 62 being coupled to the lugs 64 by means of links 63.

The hoops are rounded off at their ends and shaped pointing to one another and are supported only at the parts of the hoops which point towards one another. In the transportable condition and also in the folded condition the superimposed hoops provide at the two narrow sides and on one long side a border-like construction. Advantageously the ends 29, which face one another, can be constructed of such a length, which is necessary for rounding off and for support, so as to provide on the second longitudinal side, at least in the front and rear region, a border-like construction. This is very advantageous for a simple housing of various equipment. However, in the operative condition, if the space above the vehicle is used as a sleeping space, it is desirable to provide both at the head or shoulder and foot parts a stable elevation even if this is small.

From the foregoing description, it is to be noted that a shelter is provided which is connected to one side of the vehicle and which is connected as well with the inside of the vehicle as with the space on the roof.

Finally there is hereinafter described a further embodiment of the new device when it is removed from the vehicle.

The base member 3, 4 as seen in Figure 7 is positioned on the ground.

In order to erect the tent-shelter over and beside the base member 3, 4 laid on the ground, the projecting hoop 6 is removed from its horizontal or slightly inclined position as shown in Figure 2, swung upwardly in direction of the course 42 and at the same time telescopically developed, so as to reach an oblique position indicated with dotted lines, this opened condition of the parts 30 and 6 to one another being secured by clamping means or by borings in one of these parts to which correspond push-pins 43 located in the other part. Instead of a telescoping construction the opened position can be obtained by means of a scissor-construction or other suitable means.

In the embodiment illustrated in Figure 7, three similarly shaped superimposed hoops 6, 7 and 8 are provided for using the structure separately from the vehicle. The middle hoop 7 extends vertically upwards, whereas the side hoops 6, 8 extend obliquely and upwardly in opposite directions to each other.

If there is provided a front-wall awning as in the embodiment shown in Figure 2 for use on the vehicle and said awning is made of one single canvas piece extending laterally from the vehicle embracing the rectangular part 10 and the triangular part 34 (Figure 2), the transformation of the efficient surface of this front-wall awning for using the device separately from the vehicle can be produced very easily; after swinging off and drawing out the hoops 30—6 (Figure 7) the part 34 is folded according to both triangular wedges 37, 38 along fold lines 39, 40 which for example may be marked by impressing or reinforcement staffs, on itself and over the upper part 10 whereby the folding lines 39, 40 converge to the point of fixation 35. The vertical clearance 41 produced thereby may be covered up with a hanging or other completing part.

It is however possible to avoid such a clearance if the square front-wall awning 44 on the vehicle roof 2 has a breadth 45 exceeding the breadth of the roof for the distance indicated by line 55. The overlapping of the front-wall parts 34, 44 thus formed by using the device in connection with the vehicle constitutes a profitable reinforcement. When using the device separately from the vehicle there is still a narrow but sufficient overlapping at the junction line 46 whereby the forming of a clearance 41 is prevented. In the illustrated embodiment with the front-wall 44 made broader according to the distance 55 it is obvious that in the region of the enlarged part the front-wall must be cut according to the slope 47 of the roof so as to produce the narrow oblique or sloping overlap shown in Figure 7.

The transformation will be made much easier if the inside of the plane one-piece front-wall 10 and 34 as shown in Figure 2 is provided with the sealing paths 48, 49 of a zipper fastener along the indicated lines. By proceeding with the transformation the folding described hereinbefore will be easily provided from the inside of the tent by shutting the fastener.

If the device is used separately from the vehicle the closed fastener 48, 49 then exists at the edge of the roof. The superfluous canvas which results from the folding thereof forms the overlapping falling outwardly shown in the drawing.

The lateral curtain 11 extends vertically in the embodiment shown in Figure 2; in the embodiment shown in Figure 7 the rims of the lower part 10 of the front-wall 10—34 to be seen on the right part of the drawing are supported to extend somewhat obliquely and are shown in that position. They can be completed on both sides with an inwardly sharply bent strip, forming thus a kind of entrance which can be covered with the front-wall 11. In this case a zipper fastener may also provide for the joining of the front-wall 11 with the lateral boundaries of said entrance.

If two hangings are provided at the inside of the front-wall 11, each of them in the size of a half front-wall, whereby the junction line of said hangings corresponds to the vertical median line of the front-wall 11, then it is possible to cover an additional area employing therefor the front-wall awning 11 and both hangings.

In the embodiment the front-wall awning is immovably fixed to the front piece of hoop 6. It is thus possible, by means of a support 51 and of a guy-rope 52, to bring it upwardly into the approximate horizontal position indicated with dotted lines so as to form a penthouse. The hangings mentioned hereinbefore are now able to replace the front-wall 11 and can be joined to each other or to the rims of the front-wall 10 by means of suitable fasteners such as zipper fasteners. If the joining paths of the fasteners are judiciously selected the hangings can be removed from the hoop 6 and positioned as lateral parts 56, 57 in the position indicated in Figure 7. Naturally it is also possible, if desired, as an enlargement of each of the front-wall 10, to let only one curtain hang as a lateral part from the penthouse for half the height of the room, flat or oblique. The parts 11 or 50 and 56, 57 may be employed in various ways. The arrangement of a penthouse 50 as illustrated in Figure 7 can also be applied if the device is used in connection with the vehicle.

Instead of zipper fasteners other fastening means such as for example range-fasteners or press-buttons may be employed.

It will be understood that various modifications may be made in the specific embodiments described without departing from the scope of the invention.

Moreover, this invention is not to be limited by the embodiments described and illustrated.

Having now particularly described and ascertained the said invention and what manner the same is to be performed, I declare that what I claim is:

1. A device for producing a shelter on an automotive vehicle having at least four wheels so as to be self-supporting and stable; said device comprising a rectangular frame adapted for mounting on the roof of an automotive vehicle and including side members and cross members spacing apart said side members so that the latter extend along the opposite side edges of the roof, bearing means mounted on one of said side members adjacent the opposite ends thereof, a plurality of generally U-shaped hoops each including two leg portions and a longitudinal portion connecting the latter at one end, said longitudinal and leg portions of each hoop corresponding in length to said side and cross members, respectively, of said frame, each of said hoops having the free ends of its leg portions pivotally mounted in said bearing means so that each hoop is swingable about an axis extending along said one side member between a stored position, wherein said leg portions and said longitudinal portion overlie said cross members and the other side member, respectively, and an erected position wherein each hoop is angularly displaced to a predetermined extent from its stored position, a tent awning secured along one edge to said other side member of the frame and being secured to at least said longitudinal portion of each hoop to limit the angular displacement of the latter to its erected position, said tent awning being dimensioned and so secured to said hoops that one of said hoops, in its erected position, extends vertically and upwardly from said one side member of the frame substantially in the vertical plane of the adjacent side edge of the vehicle roof, while another of said hoops, in its erected position, projects horizontally laterally beyond the adjacent side edge of the roof a distance substantially equal to the length of said leg portions thereof, and tent curtains depending from the latter said leg portions and said longitudinal portion of the horizontally positioned hoop in said erected position of the latter so that said tent awning and curtains, when supported by said hoops in the erected positions of the latter, define enclosed spaces on top of the vehicle roof and along one side of the vehicle, respectively, which are in communication with each other under the longitudinal portion of the vertically positioned hoop which defines a ridge-line, and also in communication with the interior of the automotive vehicle through doors in said one side of the latter; said free ends of the leg portions of each hoop being curved inwardly toward each other and having aligned bearing pins projecting therefrom, and each of said bearing means including a bracket extending upwardly from said one side member and having vertically spaced apart bores extending therethrough and rotatably receiving the bearing pins projecting from the adjacent free ends of said hoops so that the swinging axes of said hoops are disposed one above the other.

2. A device as in claim 1; wherein a third of said hoops is secured to said tent awning at a location on the latter limiting the swinging of said third hoop through an angle of 45 degrees from its stored position, while the vertically positioned hoop and the horizontally positioned hoop are respectively swingable through angles of 90 degrees and 180 degrees from their stored positions, whereby said third hoop forms a mansard roof between said ridge line and said edge of the tent awning secured to said other side member to increase the useful headroom in said enclosed space on top of the vehicle roof.

3. A device as in claim 1; wherein the bearing pins of the horizontally positioned hoop are received in the uppermost bores of said brackets thereby to dispose the latter said hoop at a relatively high level when in its erected position to facilitate access to said enclosed space along one side of the automotive vehicle.

4. A device as in claim 1; further comprising means extensible from said frame and engageable with the horizontally positioned hoop in the erected position of the latter to hold the latter said hoop against return toward its stored position, thereby to retain said device in the condition for defining said enclosed spaces.

5. A device as in claim 1; wherein said leg portions of the horizontally positioned hoop have extensible parts to permit an increase in the radial distance between said swinging axis of the latter said hoop and said longitudinal portion of the latter so that, when said extensible parts are extended, said tent awning limits the angular displacement of the latter said hoop at a position inclined upwardly relative to said erected position thereof.

6. A device for producing a shelter on an automotive vehicle, said device comprising a rectangular frame adapted for being mounted on the roof of an automotive vehicle and including side members and cross members extending along opposite side edges of the roof, bearing means mounted on one of said side members adjacent the opposite ends thereof, a plurality of generally U-shaped hoops each including two leg portions and a longitudinal portion connecting the latter, each of said hoops having the free ends of its leg portions pivotally mounted in said bearing means so that each hoop is swingable about an axis extending along said one side member between a stored position and an erected position, a tent awning secured along one edge to said other side member of the frame and being secured to the longitudinal portion of each hoop to limit the angular displacement of the latter to its erected position, said tent awning having dimensions such that one of said hoops, in its erected position, extends upwardly from said one side member of the frame substantially in the vertical plane of the adjacent side edge of the vehicle roof, while another of said hoops, in its erected position, projects horizontally and laterally beyond said adjacent side edge of the roof, and tent curtains depending from the horizontally positioned hoop to define an enclosed space along one side of the vehicle; said free ends of the leg portions of each hoop being curved inwardly toward each other and having bearing pins projecting therefrom, and each of said bearing means including a bracket extending upwardly from said one side member and having vertically spaced apart bores extending therethrough and rotatably receiving the bearing pins projecting from the adjacent free ends of said hoops so that the swinging axes of said hoops are disposed one above the other.

References Cited in the file of this patent

UNITED STATES PATENTS

| | | |
|---|---|---|
| 1,185,981 | Campbell et al. | June 6, 1916 |
| 2,434,387 | Brandt | Jan. 13, 1948 |
| 2,459,026 | Hardy | Jan. 11, 1949 |
| 2,530,450 | Cast | Nov. 21, 1950 |

FOREIGN PATENTS

| | | |
|---|---|---|
| 144,660 | Australia | May 12, 1949 |
| 344,982 | Italy | Dec. 5, 1936 |
| 1,039,577 | France | May 20, 1953 |